US008408661B2

(12) United States Patent
Chen

(10) Patent No.: US 8,408,661 B2
(45) Date of Patent: Apr. 2, 2013

(54) ELECTRONIC DEVICE ENCLOSURE

(75) Inventor: Li-Ping Chen, Tu-Cheng (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 38 days.

(21) Appl. No.: 13/046,853

(22) Filed: Mar. 14, 2011

(65) Prior Publication Data

US 2012/0049701 A1 Mar. 1, 2012

(30) Foreign Application Priority Data

Aug. 30, 2010 (CN) .......................... 2010 1 0266517

(51) Int. Cl.
*A47B 81/00* (2006.01)
*H05K 5/00* (2006.01)
(52) U.S. Cl. ............................... 312/223.2; 361/679.32
(58) Field of Classification Search ............... 312/223.1, 312/223.2; 361/679.32
See application file for complete search history.

(56) References Cited

U.S. PATENT DOCUMENTS

| 6,309,037 | B2 * | 10/2001 | Bertolami | 312/223.2 |
|---|---|---|---|---|
| 6,704,205 | B1 * | 3/2004 | Chen | 361/740 |
| 6,927,984 | B2 * | 8/2005 | Chen | 361/801 |
| 7,130,200 | B1 * | 10/2006 | Liu | 361/801 |
| 7,855,898 | B2 * | 12/2010 | Tang | 361/801 |
| 2001/0053060 | A1 * | 12/2001 | Gan | 361/683 |
| 2006/0002073 | A1 * | 1/2006 | Fan | 361/684 |
| 2007/0030631 | A1 * | 2/2007 | Liang et al. | 361/600 |
| 2007/0064382 | A1 * | 3/2007 | Hsiao | 361/685 |
| 2007/0177267 | A1 * | 8/2007 | Chen et al. | 359/514 |
| 2008/0000850 | A1 * | 1/2008 | Peng et al. | 211/41.17 |
| 2008/0212295 | A1 * | 9/2008 | Xiao | 361/759 |
| 2009/0154119 | A1 * | 6/2009 | Chen et al. | 361/759 |
| 2009/0244862 | A1 * | 10/2009 | Wu et al. | 361/759 |
| 2010/0002378 | A1 * | 1/2010 | Chen et al. | 361/679.58 |
| 2010/0103602 | A1 * | 4/2010 | Xue | 361/679.4 |
| 2011/0110051 | A1 * | 5/2011 | Chen | 361/748 |
| 2011/0116229 | A1 * | 5/2011 | Hsieh et al. | 361/679.58 |
| 2011/0285259 | A1 * | 11/2011 | Chen | 312/223.2 |
| 2011/0310576 | A1 * | 12/2011 | Chen | 361/759 |

* cited by examiner

*Primary Examiner* — David Dunn
*Assistant Examiner* — Ryan A. Doyle
(74) *Attorney, Agent, or Firm* — Altis Law Group, Inc.

(57) ABSTRACT

An electronic device enclosure includes a computer case, a mounting tray for receiving an expansion card and a fastening member. The computer case includes a front plate. A positioning slot and an opening are defined in the front plate. The fastening member includes a main body attached to the mounting tray and a latching plate connected to the main body. The latching plate is positioned in the positioning slot. An inserting portion is located on the latching plate and elastically engaged in the opening.

7 Claims, 5 Drawing Sheets

ELECTRONIC DEVICE ENCLOSURE

BACKGROUND

1. Technical Field

The present disclosure relates to an electronic device enclosure.

2. Description of Related Art

A computer system usually includes expansion cards, such as sound cards, and video cards, for enhancing capabilities of the computer system. The expansion cards are often attached to the computer system using a fixing member, the fixing member is often secured to the computer system by a plurality of screws. However, it is laborious and very time-consuming to use multiple screws to secure the fixing member.

BRIEF DESCRIPTION OF THE DRAWINGS

Many aspects of the exemplary embodiments can be better understood with references to the following drawings. The components in the drawings are not necessarily drawn to scale, the emphasis instead being placed upon clearly illustrating the principles of the exemplary embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" exemplary embodiment in this disclosure are not necessarily to the same exemplary embodiment, and such references mean at least one.

Figure 1:
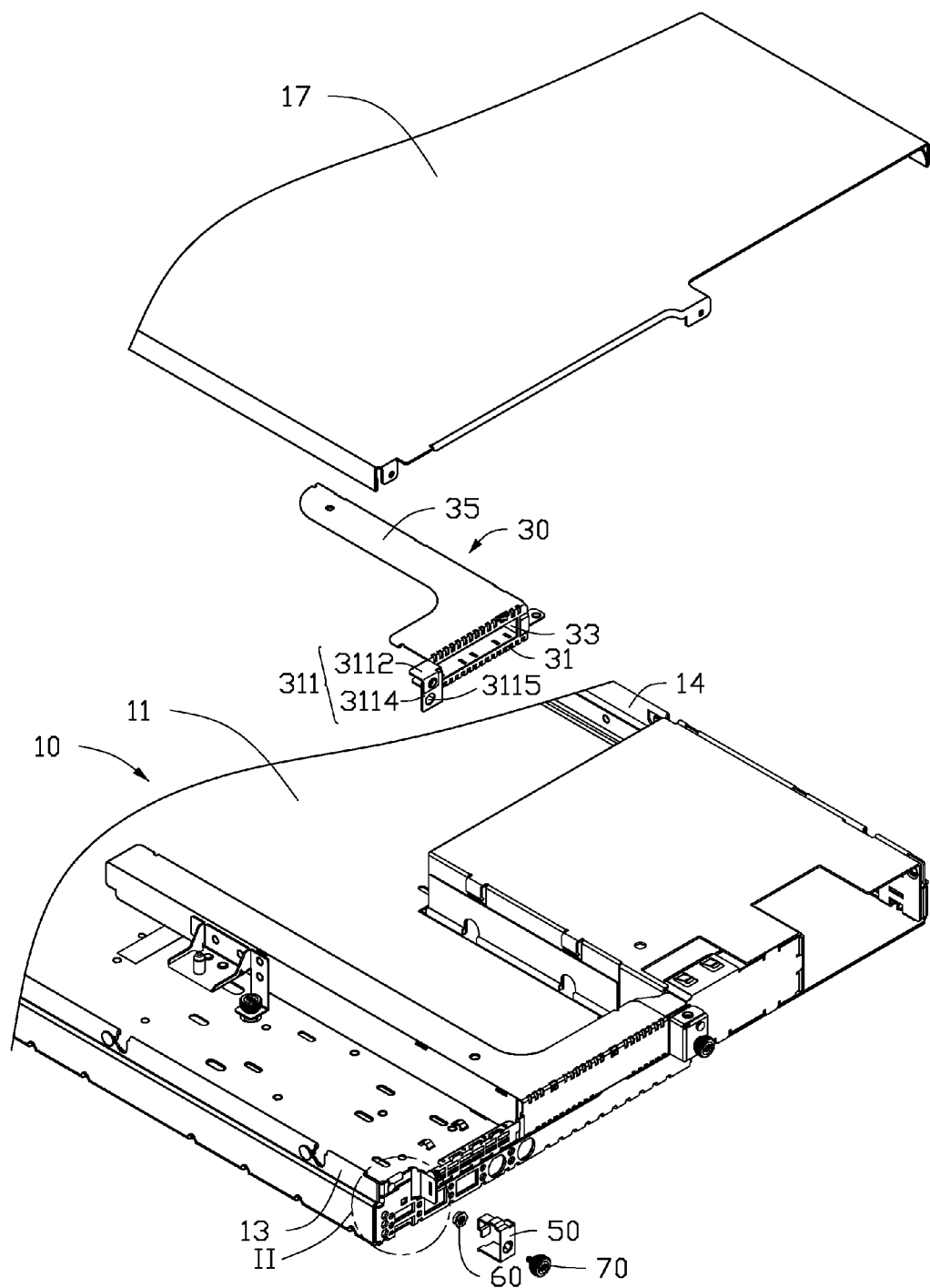
FIG. 1 is an isometric, cutaway view of an electronic device enclosure in accordance with an exemplary embodiment.
Figure 2:
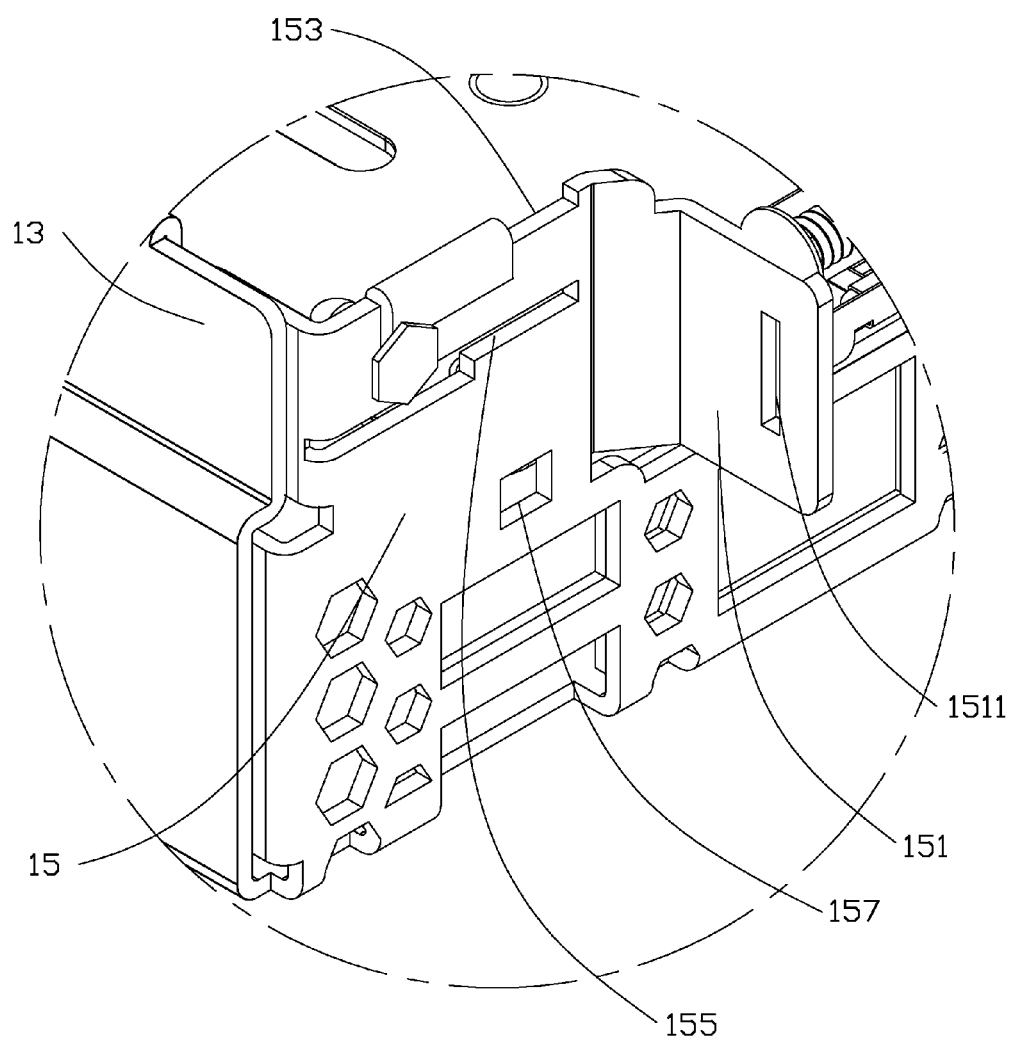
FIG. 2 is an enlarged view of circled portion II of FIG. 1.

Referring to FIGS. 1 and 2, an electronic device enclosure in accordance with an exemplary embodiment includes a computer case 10, a mounting tray 30, and a fastening member 50 for securing the mounting tray 30 to the computer case 10. In one exemplary embodiment, the mounting tray 30 is used to secure a plurality of expansion cards (not shown).

The computer case 10 includes a bottom plate 11, a first side plate 13, a second side plate 14, a front plate 15 connected to the first side plate 13 and the second side plate 14, and a cover 17 for covering the computer case 10. In one exemplary embodiment, the first side plate 13 and the second side plate 14 are substantially parallel to each other and perpendicular to the bottom plate 11, and the front plate 15 is substantially perpendicular to the bottom plate 11.

A retaining member 151, adjacent to the first side plate 13, extends from the front plate 15. A retaining slot 1511 is defined in the retaining member 151. In one exemplary embodiment, the retaining member 151 is substantially parallel to the first side plate 13. A positioning slot 153, an opening 155 and a sliding groove 157 are defined in the front plate 15 and are located between the retaining member 151 and the first side plate 13.

The mounting tray 30 includes a front panel 31, a side panel 33 connected to the front panel 31, and a top panel 35 connected to the front panel 31 and the side panel 33. A securing portion 311, connected to the front panel 31, includes an extending piece 3112, and a securing piece 3114 attached to the extending piece 3112. A securing hole 3115 is defined in the securing piece 3114. In one exemplary embodiment, the securing piece 3114 is substantially perpendicular to the extending piece 3112.

Figure 3:
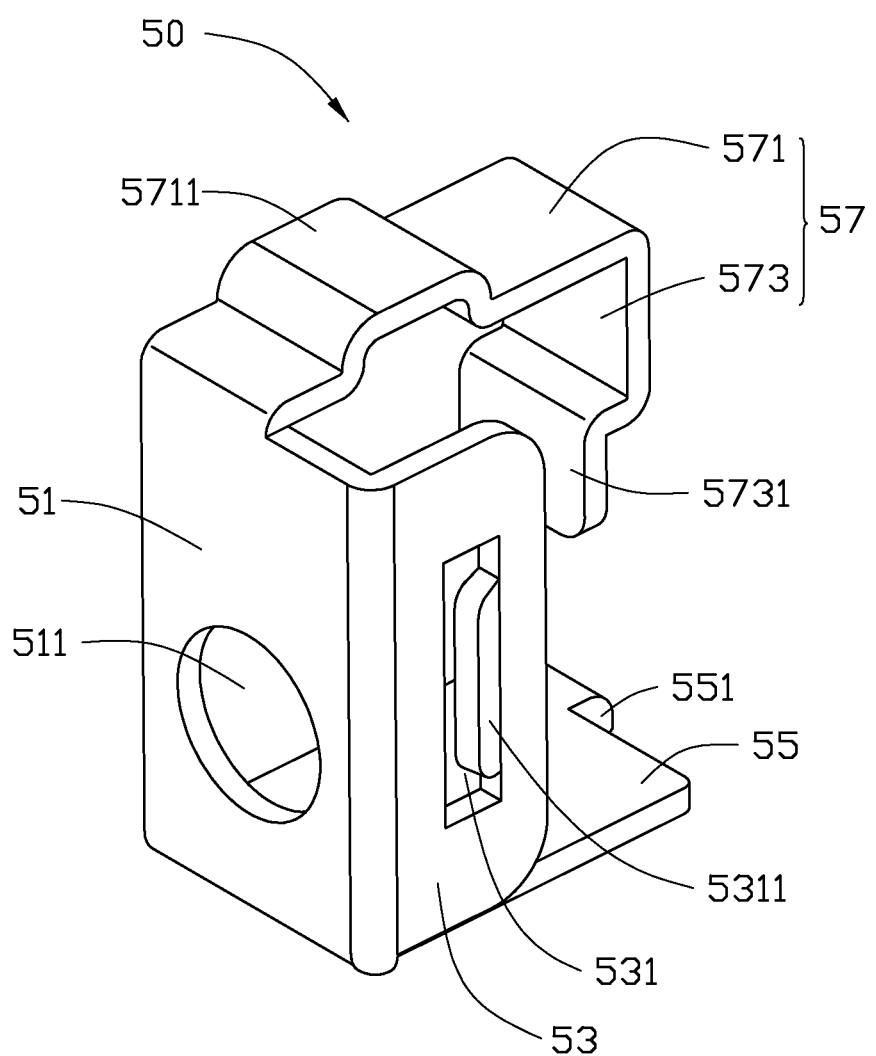
FIG. 3 is an isometric, cutaway view of a fastening member of the electronic device enclosure.

Referring to FIG. 3, the fastening member 50 includes a main body 51, a clipping plate 53, a positioning plate 55, and a latching plate 57. A mounting hole 511, corresponding to the securing hole 3115, is defined in the main body 51. A through hole 531 is defined in the clipping plate 53, and a clipping piece 5311 is connected to a first edge of the through hole 531. In one exemplary embodiment, the clipping piece 5311 is slanted.

A catch 551 is located on a free end of the positioning plate 55. In one exemplary embodiment, the catch 551 is arcuate and for being received to slide in the sliding groove 157 of the front plate 15. The latching plate 57 includes a first section 571, and a second section 573 connected to the first section 571. A protruding block 5711 is located on the center of the first section 571, for abutting the extending piece 3112 of the securing portion 311. An inserting portion 5731 vertically extends from the second section 573. In one exemplary embodiment, the inserting portion 5731 is elastic and L-shaped.

Figure 4:
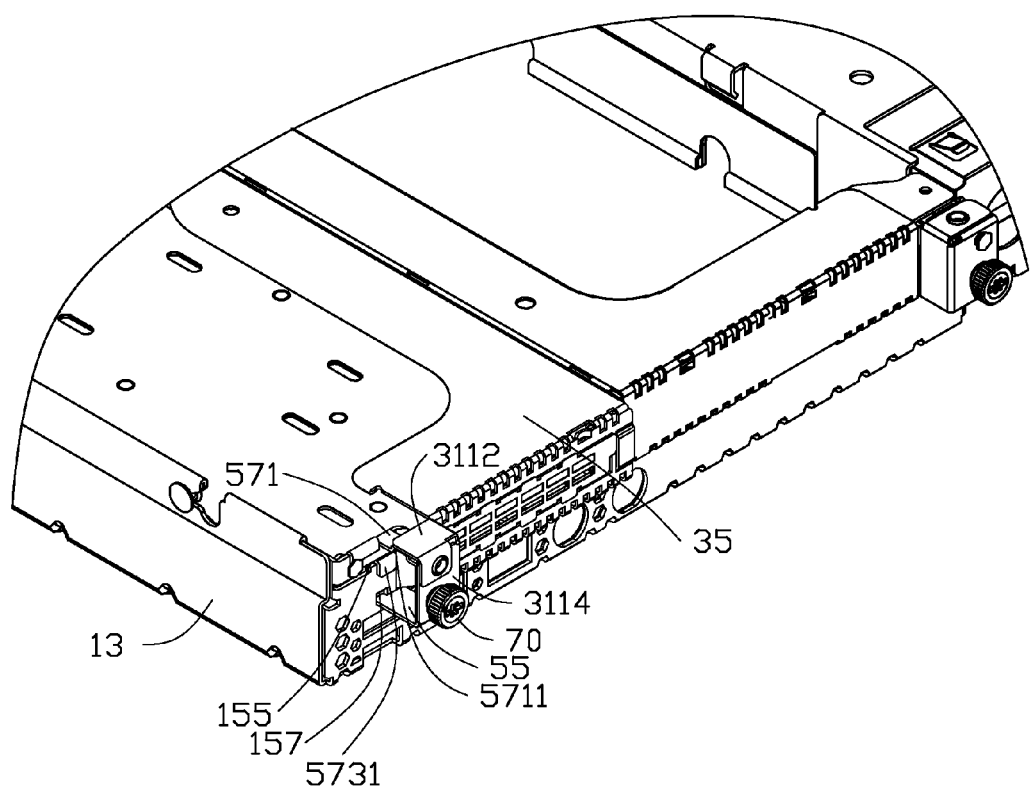
FIG. 4 is an assembled, cutaway view of FIG. 1, but a cover is not shown.
Figure 5:
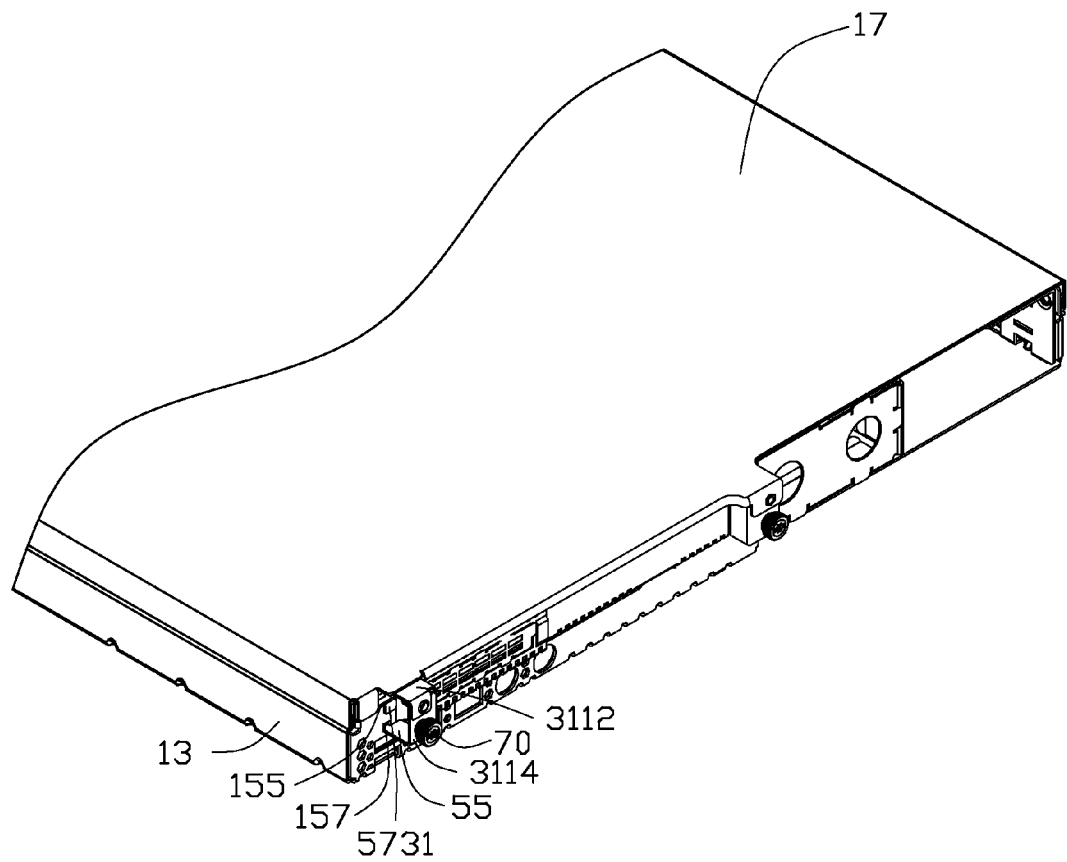
FIG. 5 is an assembled, cutaway view of FIG. 1.

Referring to the FIGS. 4-5, in assembly, the positioning plate 55 and the latching plate 57 of the fastening member 50 are facing the front plate 15, and the clipping plate 53 abuts the retaining member 151. The fastening member 50 is moved towards the front plate 15, and the first section 571 of the latching plate 57 is engaged into the positioning slot 153. The second section 573 of the latching plate 57 is located adjacent the front plate 15 inside of the computer case 10, and the catch 551 of the positioning plate 55 abuts the front plate 15. The fastening member 50 is rotated to move the inserting portion 5731, and the inserting portion 5731 is deformed to pass through the opening 155 of the front plate 15. Then, the inserting portion 5731 is released to rebound and is located outside of the computer case 10. The main body 51 of the fastening member 50 is pushed, and the catch 551 is engaged into the sliding groove 157. The clipping piece 5311 of the clipping plate 53 is engaged in the retaining slot 1511 of the retaining member 151. Therefore, the fastening member 50 is secured to the front plate 15.

The mounting tray 30 is placed above the bottom plate 11, and the front panel 31 of the mounting tray 30 abuts the front plate 15. The extending piece 3112 of the securing portion 311 covers the first section 571 of the fastening member 50, and the securing piece 3114 abuts the main body 51 of the fastening member 50. The securing hole 3115 of the securing piece 3114 is aligned with the mounting hole 511 of the main body 51. A nut 60 abuts the inside of the main body 51, and a mounting component 70 is passed through the securing hole 3115 and the mounting hole 511, for being engaged into the nut 60. Thus, the mounting tray 30 is secured to the front plate 15. Then, the protruding block 5711 abuts the bottom of the extending piece 3112.

In disassembly, the mounting component 70 and the nut 60 is removed from the fastening member 50 and the front plate 15. The inserting portion 573 is elastically deformed for being disengaged from the opening 155. The fastening member 50 is moved upwards, the latching plate 57 is removed from the positioning slot 153, and the catch 551 of the positioning plate 55 is slid in the sliding groove 157 of the front plate 15. The fastening member 50 is moved further, so the catch 551 is disengaged from the sliding groove 157, and the clipping piece 5311 is removed from the retaining slot 1511. The fastening member 50 is removed from the front plate 15. Therefore, the mounting tray 30 is disengaged from the computer case 10.

It is to be understood, however, that even though numerous characteristics and advantages have been set forth in the foregoing description of embodiments, together with details of the structures and functions of the embodiments, the disclosure is illustrative only and changes may be made in detail, especially in matters of shape, size, and arrangement of parts within the principles of the disclosure to the full extent indicated by the broad general meaning of the terms in which the appended claims are expressed.

What is claimed is:

1. An electronic device enclosure comprising:
   a computer case comprising a front plate, a bottom plate substantially perpendicular to the front plate, and a retaining member substantially perpendicular to the front plate and the bottom plate;
   a mounting tray for receiving an expansion card; the mounting tray comprises a securing portion; and the securing portion comprises an extending piece; and
   a fastening member comprising a main body, a clipping plate connected to the main body and a latching plate connected to the main body, the latching plate comprising a first section; a protruding block located on the first section and abutting the extending piece; the main body is attached to the mounting tray, the clipping plate is attached to the retaining member, and the latching plate is engaged with the front plate;
   wherein a positioning slot and an opening are defined in the front plate; the first section is engaged in the positioning slot; the latching plate further comprises a second section connected to the first section and an inserting portion extending from the second section; the second section abuts inside of the front plate; the inserting portion extends through the opening and located outside of the front plate; the second section is substantially perpendicular to the first section, and the inserting portion is substantially L-shaped.

2. The electronic device enclosure of claim 1, wherein the mounting tray comprises a front panel, and the securing portion is attached to an edge of the front panel.

3. The electronic device enclosure of claim 2, wherein the securing portion further comprises a securing piece substantially perpendicular to the extending piece, and the securing piece is secured to the main body.

4. The electronic device enclosure of claim 1, wherein the fastening member further comprises a positioning plate substantially perpendicular to the main body, a catch being arcuate, extends from the positioning plate, a sliding groove is defined in the front plate, and the catch is slidably received in the sliding groove.

5. The electronic device enclosure of claim 1, wherein a clipping piece is located on the clipping plate, and a retaining slot is defined in the retaining member for receiving the clipping piece.

6. The electronic device enclosure of claim 5, wherein a through hole is defined in the clipping plate, and the clipping piece is connected to an edge of the through hole and slanted towards the main body.

7. An electronic device enclosure comprising:
   a computer case comprising a front plate, a bottom plate substantially perpendicular to the front plate, and a retaining member substantially perpendicular to the front plate and the bottom plate;
   a mounting tray for receiving an expansion card; the mounting tray comprises a securing portion; and the securing portion comprises an extending piece; and
   a fastening member comprising a main body, a clipping plate connected to the main body and a latching plate connected to the main body, the latching plate comprising a first section; a protruding block located on the first section and abutting the extending piece; the main body is attached to the mounting tray, the clipping plate is attached to the retaining member, and the latching plate is engaged with the front plate;
   wherein a positioning slot and an opening are defined in the front plate; the first section is engaged in the positioning slot; the latching plate further comprises a second section connected to the first section and an inserting portion extending from the second section; the second section abuts inside of the front plate; the inserting portion extends through the opening and located outside of the front plate; the mounting tray comprises a front panel, and the securing portion is attached to an edge of the front panel; the securing portion further comprises a securing piece substantially perpendicular to the extending piece, and the securing piece is secured to the main body.

\* \* \* \* \*